United States Patent

Yamada et al.

Patent Number: 5,536,804
Date of Patent: Jul. 16, 1996

[54] OXAZOLIDONE RING-CONTAINING MODIFIED EPOXY RESINS AND CATHODIC ELECTRODEPOSITION PAINTS CONTAINING SAME

[75] Inventors: Mitsuo Yamada, Suita; Toshiyuki Ishii, Sakai; Hiroyuki Nojiri; Ichiro Kawakami, both of Takatsuki, all of Japan

[73] Assignee: Nippon Paint Co., Ltd., Osaka, Japan

[21] Appl. No.: 464,950

[22] Filed: Jun. 5, 1995

Related U.S. Application Data

[62] Division of Ser. No. 243,017, May 16, 1994, Pat. No. 5,446,077.

[30] Foreign Application Priority Data

May 17, 1993 [JP] Japan .................................. 4-139588
May 17, 1993 [JP] Japan .................................. 4-139590

[51] Int. Cl.$^6$ .................................................. C08G 18/58
[52] U.S. Cl. .............................. 528/45; 523/415; 528/58; 528/92
[58] Field of Search ........................ 523/415; 528/45, 528/58, 92

[56] References Cited

U.S. PATENT DOCUMENTS

| | | | |
|---|---|---|---|
| 5,272,189 | 12/1993 | Kaufman | 523/415 |
| 5,276,072 | 1/1994 | Ishii et al. | 523/415 |
| 5,446,077 | 8/1995 | Yamada et al. | 523/415 |

Primary Examiner—Melvyn I. Marquis
Assistant Examiner—D. Aylward
Attorney, Agent, or Firm—Millen, White, Zelano & Branigan

[57] ABSTRACT

Polyglycidyl epoxy resins are modified to have a blocked isocyanate moiety bound to the resin backbone through an oxazolidone ring by reacting the epoxy resin with an asymmetrically blocked diisocyanate. Further reaction with a cationic active hydrogen compound gives a modified epoxy resin having a cationic group in addition to the blocked isocyanate moieties. The modified epoxy resins are incorporated into cathodic electrodeposition paint as a crosslinker or cationic binder resin or pigment dispersing agent.

5 Claims, No Drawings

OXAZOLIDONE RING-CONTAINING MODIFIED EPOXY RESINS AND CATHODIC ELECTRODEPOSITION PAINTS CONTAINING SAME

This is a division of the application Ser. No. 08/243,017 filed May 16, 1994, now U.S. Pat. No. 5,446,777.

BACKGROUND OF THE INVENTION

This invention relates to oxazolidone ring-containing modified epoxy resins.

The invention also relates to cathodic electro-deposition paints containing said modified epoxy resins.

Modified epoxy resins to be formulated in cathodic electrodeposition paints are conventionally produced by reacting an epoxy resin with a first active hydrogen compound such as alkyl phenols, monocarboxylic acids or hydroxycarboxylic acids to open a portion of the epoxide rings, and then with a second active hydrogen compound such as primary or secondary amines to open the remaining epoxide rings. The resulting modified resins are combined with a crosslinker such as melamine resins or blocked organic polyisocyanates, applied electrically onto a substrate, and baked at an elevated temperature to give a cured film. Modified epoxy resins of this type have certain disadvantages in that they react with the crosslinker only at relatively high temperatures. It is also known to make the modified epoxy resins self-crosslinkable by attaching a half blocked diisocyanate to a secondary alcoholic hydroxyl group formed by the ring-opening reaction of the epoxy ring. This resin also suffers from certain disadvantages in that the blocked isocyanate moiety bound through the urethane linkage tends to be liberated at least partially when the film is baked at a temperature above 200° C.

Commonly assigned U.S. Pat. No. 5,276,072 discloses a hydrophilic resin having an oxazolidone ring-containing backbone and an ionizable group at the terminals of the backbone. The resin backbone is produced by reacting an organic diisocyanate and an epoxy resin at an epoxy/isocyanate equivalent ratio greater than 1 so that all of the isocyanato groups are converted to the oxazolidone rings.

We have now found that by reversing the epoxy/isocyanate equivalent ratio, it is possible to produce an epoxy resin-diisocyanate adduct in which only one isocyanato group has been converted to the oxazolidone ring and the other isocyanato group has been reversibly blocked or otherwise modified in a useful manner.

SUMMARY OF THE INVENTION

In one aspect, the present invention provides a modified epoxy resin having bound thereto a plurality of blocked isocyanate moieties through an oxazolidone ring formed by the reaction between at least a portion of the epoxy rings of a polyglycidyl epoxy resin and one isocyanato group of an organic diisocyanate, the other isocyanato group thereof being reversibly blocked. This modified epoxy resin may be incorporated to advantage into cathodic electrodeposition paints as a crosslinker.

In another aspect, the present invention provides a modified epoxy resin having bound thereto at least one blocked isocyanate moiety through an oxazolidone ring formed by the reaction between a portion of the epoxy rings of a polyglycidyl epoxy resin and one isocyanato group of an organic diisocyanate, the other isocyanato group thereof being reversibly or irreversibly blocked, the modified epoxy resin further having introduced thereto at least one cationic group by the ring-opening reaction of the remaining epoxy rings with a cationic active hydrogen compound. The modified epoxy resin of this type may also be incorporated into cathodic electrodeposition paints as a cationic binder resin.

Since the oxazolidone ring connecting the blocked isocyanate moiety to the resin backbone is thermally stable, the modified epoxy resin of the present invention will hardly split off when heated to elevated temperatures.

In a further aspect, the present invention provides a method for producing a modified epoxy resin comprising:
reacting an epoxy resin having a plurality of glycidyl groups with an asymmetrically blocked organic diisocyanate having a first blocked isocyanato group and a second blocked isocyanato group which is less reactive than the first blocked isocyanato group in equal to or less than stoichiometric amount relative to the ratio of said first blocked isocyanate group to said glycidyl group.

In a still further aspect, the present invention provides a method for producing a modified epoxy resin which comprises the steps of :
reacting an epoxy resin having a plurality of glycidyl groups with an asymmetrically blocked organic diisocyanate having a first blocked isocyanato group and a second blocked isocyanato group which is less reactive than the first blocked isocyanato group in less than stoichiometric amount relative to the ratio of said first blocked isocyanato group to the glycidyl group; and reacting the resulting product with a cationic active hydrogen compound for introducing an cationic group by the ring-opening reaction of the remaining epoxy rings with said cationic active hydrogen compound.

The present invention also provides a cathodic electrodeposition paint comprising the inventive modified epoxy resin.

DETAILED DESCRIPTION OF THE INVENTION

Starting Resins

The modified epoxy resin of the present invention is produced by starting from an epoxy resin having a plurality of glycidyl groups. Typical examples thereof include polyphenol polyglycidyl ether type epoxy resins produced by reacting a polycyclic polyphenol such as bisphenol A, bisphenol F, bisphenol S, phenol novolac or cresol novolac with epichlorohydrine. A variety of bisphenol epoxy resins are commercially available including EPIKOTE 827 (epoxy equivalent 180–190), EPIKOTE 1001 (epoxy equivalent 450–500), EPIKOTE 1010 (epoxy equivalent 3000–4000), all sold by Yuka Shell Epoxy, K.K. Also included in usable epoxy resins are polyglycidyl ethers of aliphatic polyols such as ethylene glycol, propylene glycol, 1,4-butanediol, 1,6-hexanediol, trimethylolpropane, pentaerythritol, polyalkylene glycol and the like, and polyglycidyl esters of aliphatic, alicyclic or aromatic polycarboxylic acids.

For use as a starting resin, bifunctional epoxy resins may be chain extended using the reaction with bifunctional polyols, polycarboxylic acids, polyisocyanate, polyphenols or polyamines. Examples of bifunctional polyols include bifunctional polyether polyols such as polyoxyethylene glycols, polyoxypropylene glycols, polyoxytetramethylene glycols, random or block copolymers thereof, or bisphenol A-ethylene oxide or propylene oxide adducts, bifunctional polyester polyols produced by the polycondensation reaction of dicarboxylic acids or acid anhydrides with glycols, and polycaprolactone diol produced by the polymerization reaction of ∈-caprolactone initiated by a glycol. These bifunctional polyols preferably have a molecular weight from 300 to 3000. Bisphenols such as bisphenol A or bisphenol F and aliphatic or aromatic dicarboxylic acids such as succinic, adipic, azelaic, dodecanedioic, dimer, phthalic, isophthalic or terephthalic acid may also be used in the chain extending reaction.

Chain extending reactions of bifunctional epoxy resins with an organic diisocyanate are disclosed in Iwakura et al., J. Polymer Sci., Part A-1, 4, 751 (1966) and Sander et al., J. Appl. Polymer Sci., 9, 1984 (1966). Chain extended epoxy resins resulting from these reactions contain a plurality of oxazolidone rings in the resin backbone.

The starting epoxy resins have a molecular weight generally between 150 and 2,000 and preferably between 150 and 1,500.

Organic Diisocyanates

As will be discussed later in detail, organic diisocyanates are used in the production of the modified epoxy resins of the present invention. Examples of usable diisocyanates include aromatic diisocyanates such as tolylenediisocyanate (TDI), xylylenediisocyanate (XDI), 4, 4'-diphenylmethanediisocyanate (MDI) and the like; and aliphatic and alicyclic diisocyanates such as hexamethylenediisocyanate (HMDI), isophoronediisocyanate (IPDI), 4,4-methylenebis(cyclohexylisocyanate), trimethylhexamethylenediisocyanate and the like.

Modified Epoxy Resins For Crosslinker

For better understanding, the reaction involved in the production of the first type of modified epoxy resin of the present invention may be represented by the following model reaction scheme:

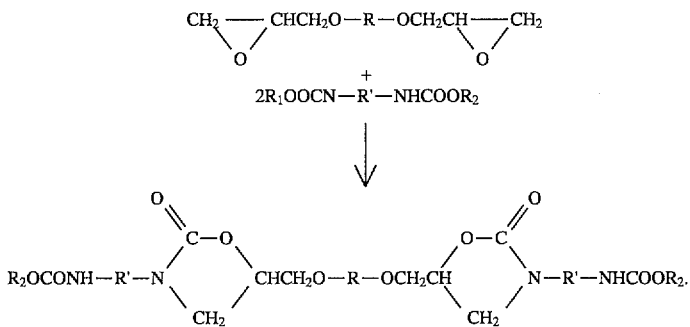

In the above equation, R is the residue of diglycidyl epoxy resin, R' is the residue of organic diisocyanate, $R_1$ and $R_2$ are the residues of monoalcohols used as the first and second blocking agents.

As illustrated by the above reaction scheme, the starting epoxy resin is reacted preferably with an asymmetrically blocked organic diisocyanate although symmetrically blocked isocyanates may also be used.

A variety of blocking agents are well-known in the art. Examples thereof include aliphatic alcohols such as methanol, ethenol, isopropanol, n-butanol, 2-ethylhexanol, ethyleneglycol monobutyl ether, cyclohexanol and the like; phenols such as phenol, nitrophenol, ethylphenol and the like; oximes such as methyl ethyl ketoxime; and lactams such as ∈-caprolactam. In the above reaction, one of the first and second blocked isocyanate groups should preferentially react with the epoxy ring while the other should remain blocked. This may be achieved by blocking the first and second isocyanato groups with different blocking agents. In a preferred embodiment, the first isocyanate group is blocked with methanol or ethanol. The second isocyanato group may be blocked with an aliphatic monoalcohol having at least four carbon atoms such as butanol or 2-ethylhexanol, alkylphenols such as cresol or nonylphenol, glycol monoethers such as ethylene glycol mono-2-ethylhexyl ether or propylene glycol mono-2-ethylhexyl ether, oximes such as dimethylketoxime, methylethylketoxime or methylisobutylketoxime, caprolactam or the like. Preferably, methanol or ethanol is reacted prior to the reaction with other blocking agents.

The ratio of blocked diisocyanate to epoxy resin may vary depending upon the number of blocked isocyanate moieties per molecule in the finished product as desired. For example, when the starting epoxy resin is reacted with the blocked diisocyanate in equal to stoichiometric amount relative to the ratio of first blocked isocyanato group to epoxy ring, the product will have the same number of blocked isocyanate moieties as the functionality of the starting epoxy resin. When the blocked diisocyanate is less than the stoichiometric amount, a portion of epoxy rings will remain unreacted. The product having a plurality of blocked isocyanate moieties per molecule may be used as a crosslinker in formulating epoxy-based cathodic electrodeposition paints. The product having remaining epoxy rings may also be formulated in cathodic electrodeposition paints or it may be reacted further with a cationic active hydrogen compound to produce a cationically ionizable binder resin as will be fully discussed below. The reaction may preferably carried out at a temperature between 60° C. and 200° C. As the reaction proceeds, the first blocking agent such as methanol or ethanol is liberated. This blocking agent is preferably removed from the reaction mixture using a conventional technique.

Cationic Binder Resins

The modified epoxy resin of the present invention useful as a cationic binder resin of cathodic electrodeposition paints is produced in two steps. The first step is generally identical to the reaction between the starting epoxy resin and the blocked diisocyanate as fully discussed above. However, the product of the first step should have at least one remaining epoxy ring per molecule.

The second step involves the reaction with a cationic active hydrogen compound for introducing a cationically ionizable group into the product of the first step using the remaining epoxy ring.

For better understanding again, the second step may be represented by the following equation:

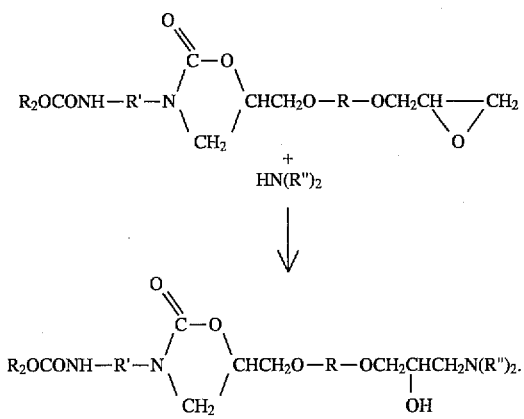

In the above equation, R, R' and $R_2$ are as defined above, and R" is the residue of secondary amine. It should be appreciated, however, the second blocking agent corresponding to $R_2$ need not necessarily be a reversible blocking agent. In other words, the organic diisocyanate may asymmetrically be blocked first with a reversible blocking agent such as methanol or ethanol and then with a irreversible blocking agent. Preferably examples of irreversible blocking agents include tertiary aminoalkanols such as dimethylethanolamine, diethylethanolamine or dipropylethanolamine, and secondary amines such as diethylamine, di-n-butylamine or di-t-butylamine. These compounds serve to introduce an additional cationic group to cationic binder resins. Aliphatic monocarboxylic acid may also be used for blocking the second NCO group.

In the second step, a cationic active hydrogen compound is used to open the remaining epoxy ring in the product of the first step. Examples of usable cationic active hydrogen compounds include primary or secondary amines such as butylamine, octylamine, diethylamine, dibutylamine, methylbutylamine, monoethanolamine, diethanolamine or N-methylethanolamine, tertiary amine-acid addition salts such as triethylamine hydrochloride or N,N-dimethylethanolamine acetate, and sulfide-acid mixtures such as diethylsulfide-acetic acid mixture. Ketimines of a primary amine such as aminoethylethanolamine or diethylenetriamine may also be used. Any combination of these amines and ketimines may also be used. Care should be taken when using a primary amine because it also plays the role of a chain extender and renders the resin too viscous. For use as binder resins, it is preferable for the resulting modified resin to have an amine equivalent from 0.3 to 4.0 meq/g. If the amine equivalent is too low, emulsification or dispersion in an aqueous medium becomes difficult. Conversely, if the amine equivalent is too high, it is hardly possible to give a film having a satisfactory water resistance.

Modified resins having quaternary ammonium or sulfonium moieties are useful as a dispersing agent of pigment pastes. To this end, the remaining epoxy ring or rings of the product of the first step are opened with the reaction with a tertiary amine-acid addition salt or mixture or a sulfide-acid mixture. Preferable tertiary amines and sulfides used for this purpose include aliphatic tertiary amines having a hydroxyl substituent such as dimethylethanolamine or diethylethanolamine and aliphatic sulfides having a hydroxyl substituent such as thiobisethanol, 1-(2-hydroxyethylthio)-2,3-propanediol, 1-(2-hydroxyethylthio)-2-propanol, 1-(2-hydroxypropylthio)-2,3-propanediol, 1-(2-hydroxyethylthio)-2-butanol, 1-(2-hydroxyethylthio)-3-butoxy-1-propanol. Examples of preferable carboxylic acids include formic acid, lactic acid, acetic acid, propionic acid, butyric acid, dimethylolpropionic acid, N-acetylglycine, N-acetyl-β-alanine and the like. Modified resins used for pigment dispersing purposes should have a base equivalent between 0.5 and 1.5 meq/g.

Electrodeposition Paints

The modified epoxy resins having only blocked isocyanate moieties may be incorporated as a crosslinker into cathodic electrodeposition paint formulations containing as binder resins conventional cationic epoxy-based resins or oxazolidone ring-containing resins as disclosed herein or in U.S. Pat. No. 5,276,076 cited above. Briefly, conventional cationic epoxy-based resins are produced by reacting an epoxy resin such as bisphenol epoxy resins first with an alkylphenol, monocarboxylic acid or hydroxycarboxylic acid to open a portion of epoxy rings and then with an amine to open the remaining epoxy rings.

The modified epoxy resins having both blocked isocyanate and cationic moieties crosslink themselves or with the aid of external crosslinkers such as blocked polyisocyanates or melamine resins. When formulated in cathodic electrodeposition paints, their characteristic performance may be exhibited to the fullest extent. As discussed before, conventional modified epoxy resins are not satisfactory in the reactivity with crosslinkers. The modified epoxy resin of the present invention satisfies with not only the reactivity with crosslinkers but also other performance including emulsifiability, thermal flowability, corrosion resistance and heat resistance.

For preparing electrodeposition paints, the modified resins of the present invention is dispersed together with a crosslinker in an aqueous medium containing a neutralizing agent. Typically the crosslinker is an etherified methylolmelamine resin or blocked polyisocyanate. The neutralizing agent is, of course, an acid such as hydrochloric acid, nitric acid, phosphoric acid, formic acid, acetic acid or lactic acid.

The amount of crosslinking agent must be sufficient to give a rigid film through a crosslinking reaction with amino, hydroxyl or carboxyl groups contained in the resin and generally ranges from 5 to 50% by weight of the modified resin on solid basis. The amount of neutralizing agent is such that at least 20%, preferably 30 to 60% neutralization of the modified resin may be achieved.

When a blocked polyisocyanate is the crosslinker, the paint formulation may contain 0.1 to 5% by weight of the blocked polyisocyanate of a catalyst such as dibutyltin dilaurate, dibutyltin oxide or other urethane-cleaving catalysts. The paint formulation may, of course, have a variety of conventional additives depending upon its particular application. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like. The resulting water-borne paints may be applied on a substrate not only by the electrodeposition process but also by spraying, dipping and other conventional methods.

When used as a vehicle resin of pigment pastes to be used in cathodic electrodeposition paints, the modified resins having quaternary ammonium or sulfonium type cationic groups exhibit better performance than known resins. This is because the blocked isocyanate moiety is bound to the resin backbone through thermally stable oxazolidone ring and, therefore, hardly liberated from the resin when baking the paint film.

The pigment paste may be prepared, as is conventional, by dispersing pigments, the vehicle resin and deionized water into a particle size less than 10 microns. Pigments may be a mixture of extender pigments, coloring pigments and rustproof pigments as exemplified above in appropriate proportions. The resulting pigment pastes may be incorporated not only to the paint of which binder resin is the modified resin of the present invention but also to other paints containing acrylic, epoxy or polybutadiene binder resins. Particular advantages may be achieved when incorporating the pigment paste to, among others, the paint disclosed in commonly assigned U.S. Pat. No. 5,276,072 because the binder resins disclosed therein also have oxazolidone rings and are well compatible with the pigment paste vehicle by virtue of similarity in chemical structure.

The following examples are intended to further illustrate the invention without limiting thereto. All part and percents therein are by weight unless otherwise indicated. All epoxy equivalents and amine or base equivalents therein are on dry contents basis.

EXAMPLE 1

A flask equipped with a stirrer, condenser, nitrogen gas tube, thermometer and drip funnel was charged with 174.0 g of 2,4-/2,6-tolylenediisocyanate(80:20 weight ratio); 100 g of methyl isobutyl ketone (MIBK) and 0.28 g of dibutyltin dilaurate. To the mixture was added dropwise 34.0 g of methanol over 30 minutes while stirring and nitrogen gas bubbling. The inner temperature rose to 60 ° C. during this period. After continuing the reaction for additional 30 minutes, 174.0 g of ethylene glycol mono-2-ethylhexyl ether was added dropwise over 1 hour and allowed to react at 60°–65° C. until the absorption of isocyanato group disappeared in IR spectrometry. Thereafter 221 g of bisphenol S epoxy resin having an epoxy equivalent of 221 and 2.0 g of benzyldimethylamine were added to the flask. Then the mixture was allowed to react at 120° C. while distilling off methanol produced as a by-product until the absorption of epoxy group disappeared and the absorption of oxazolidone carbonyl at 1750 cm$^1$ was found in IR spectrometry. The product was diluted with MIBK to a nonvolatile content of 80%. The number average molecular weight of the product determined by the GPC method (same throughout examples) was 1700. This product is hereinafter referred to as Crosslinker A.

EXAMPLE 2

The process of Example 1 was followed except that 89 g of bisphenol A epoxy having an epoxy equivalent of 189 was replaced for 221 g of bisphenol S epoxy resin. The product was diluted with MIBK to a nonvolatile content of 80%. The number average molecular weight was 1500. This product was hereinafter referred to as Crosslinker B.

EXAMPLE 3

Analogous to Example 1, 250 g of 4,4'-diphenylmathane-diisocyanate was reacted with 34.0 g of methanol and then with 118 g of ethylene glycol monobutyl ether to obtain an asymmetrically blocked diisocyanate. This product was reacted with 180 g of bisphenol F diglycidyl ether resin having an epoxy equivalent of 180. After diluting to 80% nonvolatile with MIBK, a product referred to as Crosslinker C having a number average molecular weight of 1500 was obtained.

EXAMPLE 4

The process of Example 3 was followed except that 129 g of hydroquinone diglycidyl ether resin having an epoxy equivalent of 129 was replaced for 180 g of bisphenol F diglycidyl ether resin. After diluting to 80% nonvolatile with MIBK, a product referred to as Crosslinker D having a number average molecular weight of 1500 was obtained.

EXAMPLE 5

The process of Example 3 was followed except that 129 g of resorcine diglycidyl ether resin having an epoxy equivalent of 129 was replaced for 180 g of bisphenol F diglycidyl ether resin. After diluting to 80% nonvolatile, a product referred to as Crosslinker E having a number average molecular weight of 1500 was obtained.

EXAMPLE 6

The process of Example 3 was followed except that 132 g of ethylene glycol diglycidyl ether resin having an epoxy equivalent of 132 was replaced for 180 g of bisphenol F diglycidyl ether resin. After diluting to 80% nonvolatile, a product referred to as Crosslinker F having a number average molecular weight of 1500 was obtained.

EXAMPLE 7

Analogous to Example 1, 87.0 g of 2,4-/2,6-tolylenediisocyanate was reacted with 17.0 g of methanol and then with 73.0 g of ethylene glycol monohexyl ether to obtain an asymmetrically blocked diisocyanate. The product was reacted with 140 g of trimethylolpropane triglycidyl ether having an epoxy equivalent of 140. After diluting to 80% nonvolatile with MIBK, a product referred to as Crosslinker G having a number average molecular weight of 1200 was obtained.

EXAMPLE 8

The process of Example 7 was followed except that 313 g of phenol nonvolac epoxy resin having an epoxy equivalent of 313 was replaced for 140 g of trimethylolpropane triglycidyl ether. After diluting to 80% nonvolatile with MIBK, a product referred to as Crosslinker H was obtained. The self-curability of Crosslinker H was evaluated by heating at 180° C. for 1 hour in the presence of 1.5 g/100 g solid of dibutyltin oxide catalyst and the cured product was extracted with acetone under reflux for 3 hours. An insoluble fraction of 80% was obtained.

Comparative Example 1

The same reactor as used in Example 1 was charged with 174.0 g of 2,4-/2,6-tolylenediisocyanate (80:20 weight ratio), 100 g of MIBK and 0.2 g of dibutyltin dilaurate. To the mixture was added dropwise 262.0 g of ethylene glycol mono-2-ethylhexyl ether over 1 hour while stirring and nitrogen gas bubbling. The inner temperature rose to 60 ° C. during this period. After continuing the reaction for additional 30 minutes, 16.5 g of trimethylolpropane was added and allowed to react at 60°–65° C. until the absorption of isocyanato group disappeared in IR spectrometry. After diluting to 80% nonvolatile, a product referred to as Crosslinker I having a number average molecular weight of 1300 was obtained.

Comparative Example 2

Analogous to Comparative Example 1, 250.0 g of 4,4'-diphenylmethanediisocyanate was reacted with 131.0 g of ethylene glycol mono-2-ethylhexyl ether and then with 110.0 g of ethylene glycol monobutyl ether. After diluting to 80% nonvolatile, a product referred to as Crosslinker J having a number average molecular weight of 600 was obtained.

EXAMPLE 9

Binder Resin

The same reactor as used in Example 1 was charged with 425 g of bisphenol A epoxy resin having an epoxy equivalent of 850, 33.0 g p-nonylphenol and 102.0 g of MIBK. After mixing under heating to make a solution, the mixture was allowed to react at 150° C. in the presence of 3.0 g of N,N-dimethylbenzylamine until an epoxy equivalent of 1300 was reached. After cooling, 15.0 g of diethanolamine and 15.9 g of aminoethylethanolamine ketimine (79% solution in MIBK) were added to the mixture, allowed to react at 110 ° C. for two hours and diluted to 90% nonvolatile with MIBK.

EXAMPLE 10

Pigment Paste

A three necked flask equipped with a stirrer, reflux condenser and thermometer was charged with 740 g of bisphenol A epoxy resin having an epoxy equivalent of 190 (EPIKOTE 828, Yuka Shell Epoxy K.K.), 211 g of bisphenol A, 48 g of MIBK and 1.5 g of benzyldimethylamine. The mixture was allowed to react at 170° C. for 2 hours. The resulting product having an epoxy equivalent of 700 was mixed with 244 g of thiodiethanol, 268 g of dimethylolpropionic acid and 50 g of deionized water, allowed to react at 60 ° C. for 5 hours and thereafter diluted to 30% solids with ethylene glycol monobutyl ether.

A pigment paste was prepared by milling the following mixture.

| Ingredients | Amount, g |
| --- | --- |
| Pigment dispersing resin | 200.0 (60 g solids) |
| Carbon black | 4.0 |
| Kaolin | 36.0 |
| TiO$_2$ | 150.0 |
| Basic lead silicate | 10.0 |
| Deionized water | 33.3 |

EXAMPLE 11

160.0 g as solids of Crosslinker B, 240 g as solids of the binder resin of Example 9, and 5.0 g of dibutyltin oxide were thoroughly mixed. After heating to 80° C., the mixture was emulsified by slowly adding 266.6 g of deionized water containing 6.24 g of acetic acid thereto with stirring and then diluting with 445 g of deionized water to 36% solids. This emulsion was evaporated in vacuo to remove organic solvent, adjusted to 36% solids again with deionized water, mixed with 270 g of the pigment paste of Example 10, and finally diluted with 1400 g of deionized water and 30 g of ethylene glycol monohexyl ether to 20% nonvolatile to prepare a cathodic electrodeposition paint.

The paint was applied electrically on a zinc phosphate-treated steel plate used as cathode to a dry film thickness of 20 microns, baked under conditions shown in Table 1, and tested for its performance. The results are also shown in Table 1.

Examples 12–16 and Comparative Examples 3–4

As shown in Table 1, various paints were formulated using various crosslinkers, the binder resin of Example 9 and the pigment paste of Example 10 as in Example 11, and tested for their performance. The results are shown in Table 1.

TABLE 1

| | Example | | | | | | Comparative Example | |
| --- | --- | --- | --- | --- | --- | --- | --- | --- |
| | 11 | 12 | 13 | 14 | 15 | 16 | 3 | 4 |
| Component (Parts as solids) | | | | | | | | |
| Binder resin | 60 | 60 | 65 | 65 | 85 | 50 | 50 | 50 |
| Crosslinker B | 40 | | | | 15 | 50 | | |
| Crosslinker C | | 40 | | | | | | |
| Crosslinker D | | | 35 | | | | | |
| Crosslinker F | | | | 35 | | | | |
| Crosslinker I | | | | | | | 40 | |
| Crosslinker J | | | | | | | | 35 |
| Performance | | | | | | | | |
| Curability 1) | Good | Good | Good | Good | Good | Good | Good | Good |
| Heating loss, % 2) | 5.0 | 5.6 | 5.3 | 6.8 | 3.0 | 9.0 | 20.2 | 18.0 |
| Yellowing 3) | No | No | No | No | No | No | Remarkable | Slight |

Footnote of Table 1
1) After baking at 175° C. for 20 minutes, the cured film is rubbed with a fabric impregnated with acetone at 30 reciprocations. When no change is observed in the film appearance, the curability judged to be good.
2) The film as applied electrically is dried at 105° C. for three hours and then baked at 175° C. for 120 minutes. The heating loss is calculated by the weight of film before and after baking and represented in %.
3) The inner surfaces of a cylindrical metal can is spray coated with a commercial white paint for applying onto automobile bodies as a middle layer coating (alkydmelamine based white paint sold by Nippon Paint Co., Ltd.). This can is inverted and placed on a test specimen steel plate. After curing at 140° C. for 20 minutes, the coating film applied on the inner surfaces of the can is visually examined in terms of the degree of yellowing.

EXAMPLE 17

A flask equipped with a stirrer, condenser, nitrogen gas tube, thermometer and drip funnel was charged with 54.0 g of 2,4-/2,6-tolylenediisocyanate (80:20 weight ratio), 136 g of methyl isobutyl ketone (MIBK) and 0.05 g of dibutyltin dilaurate. To the mixture was added dropwise 10.9 g of methanol over 30 minutes while stirring and nitrogen gas bubbling. The inner temperature rose to 60° C. during this period. After continuing the reaction for additional 30 minutes, 54.0 g of ethylene glycol mono-2-ethylhexyl ether was added dropwise over 1 hour and allowed to react at 60 65 ° C. until the absorption of isocyanato group disappeared in IR spectrometry. Thereafter 285 g of bisphenol A epoxy resin having an epoxy equivalent of 475, 380 g of bisphenol A epoxy resin having an epoxy equivalent of 950 and 0.62 g of benzyldimethylamine were added to the flask. Then the mixture was allowed to react at 120° C. while distilling off methanol produced as a by-product until an epoxy equivalent of 1120 was reached. After cooling, 29.1 g of diethanolamine, 21.5 g of N-methylethanolamine and 32.9 g of aminoethylethanolamine ketimine (79% solution in MIBK) were added to the mixture and allowed to react at 110 ° C. for 2 hours. The IR spectrometry demonstrated the absorption of oxazolidone carbonyl at 1750 cm$^{-1}$. The product was diluted to 80% nonvolatile with MIBK to obtain Cationic resin A having a number average molecular weight of 2600 and an amine equivalent of 99 meq/100 g.

EXAMPLE 18

Analogous to Example 17, 57.4 g of 2,4-/2,6-tolylenediisocyanate (80:20 weight ratio) was reacted with 11.6 g of methanol and then with 60.8 g of ethylene glycol monobutyl ether. The resulting asymmetrically blocked diisocyanate was reacted with 309 g of bisphenol F epoxy resin having an epoxy equivalent of 475 and 332 g of bisphenol F epoxy resin having an epoxy equivalent of 950. The product was further reacted with 27.0 g of diethanolamine, 20.0 g of N-methylethanolamine and 32.9 g of aminoethylethanolamine ketimine (79% solution in MIBK) and then diluted to 80% nonvolatile with MIBK. Cationic resin B having a number average molecular weight of 2400 and an amine equivalent of 97 meq/100 was obtained.

EXAMPLE 19

A flask equipped with a stirrer, condenser, nitrogen gas tube, thermometer and drip funnel was charged with 77.5 g of 4,4'-diphenylmethanediisocyanate, 136 g of methyl isobutyl ketone (MIBK) and 0.05 g of dibutyltin dilaurate. To the mixture was added dropwise 10.9 g of methanol over 30 minutes while stirring and nitrogen gas bubbling. The inner temperature rose to 80° C. during this period. After continuing the reaction for additional 30 minutes, 52.2 g of ethylene glycol mono-2-ethylhexyl ether was added dropwise over 1 hour and allowed to react at 80°–85 ° C. until the absorption of isocyanato group disappeared in IR spectrometry. Thereafter 309.0 g of bisphenol F epoxy resin having an epoxy equivalent of 475, 3323 g of bisphenol F epoxy resin having an epoxy equivalent of 950 and 0.62 g of benzyldimethylamine were added to the flask. Then the mixture was allowed to react at 120° C. while distilling off methanol produced as a by-product until an epoxy equivalent of 1116 was reached. After cooling, 14.6 g of diethanolamine, 31.8 g of N-methylethanolamine and 32.9 g of aminoethylethanolamine ketimine (79% solution in MIBK) were added to the mixture and allowed to react at 110° C. for 2 hours. The IR spectrometry demonstrated the absorption of oxazolidone carbonyl at 1750cm$^{-1}$. After diluting to 80% nonvolatile, Cationic resin C having a number average molecular weight of 2700 and an amine equivalent of 98 meq/100 g was obtained.

EXAMPLE 20

Analogous to Example 17, 82.5 g of 4,4'-diphenylmethane-diisocyanate was reacted first with 10.5 g of methanol and then with a mixture of 34.8 g of ethylene glycol mono-2ethylhexyl ether and 11.3 g of ε-caprolactam. The resulting blocked diisocyanate was reacted with a mixture of 285 g of bisphenol F epoxy resin having an epoxy equivalent of 475 and 380 g of bisphenol F epoxy resin having an epoxy equivalent of 950. The product was further reacted with a mixture of 13.9 g of diethanolamine, 28.9 g of N-methylethanolamine and 22.0 g of aminoethylethanolamine ketimine (79% solution in MIBK), and diluted to 80% nonvolatile with MIBK. Cationic resin D having a number average molecular weight of 2600 and an amine equivalent of 95 meq/100 g was obtained.

EXAMPLE 21

Analogous to Example 17, 57.0 g of 2,4-/2.6-tolylenediisocyanate (80:20 weight ratio) was reacted first with 10.5 g of methanol and then with 54.0 g of ethylene glycol mono-2-ethylhexyl ether to produce a blocked diisocyanate. This blocked diisocyanate was reacted with a chain extended epoxy resin having an epoxy equivalent of 1200 produced by reacting 1012.0 g of bisphenol A epoxy resin having an epoxy equivalent of 650 and 86.0 g of bisphenol A-ethylene oxide adduct (BPE-100 sold by Sanyo Chemical Industries, Ltd.). The product was further reacted with a mixture of 29.1 g of diethanolamine, 21.5 g of N-methylethanolamine and 32.9 g of aminoethylethanolamine ketimine (79% solution in MIBK), and diluted to 80% nonvolatile. Cationic resin E having a number average molecular weight of 2800 and an amine equivalent of 98 meq/100 g was obtained.

Comparative Example 5

The same reactor as used in Example 17 was charged with 285.0 g of bisphenol A epoxy resin having an epoxy equivalent of 475, 77.0 g p-nonylphenol and 82.4 g of MIBK. After mixing under heating to make a solution, the mixture was allowed to react at 150° C. in the presence of 3.0 g of N,N-dimethylbenzylamine until an epoxy equivalent of 1140 was reached. After cooling, 19.2 g of diethanolamine, 27.0 g of N-methylethanolamine and 30.6 g of aminoethylethanolamine ketimine (79% solution in MIBK) were added to the mixture, allowed to react at 110° C. for two hours and diluted to 90% nonvolatile with MIBK. Cationic resin F having a number average molecular weight of 2100 and amine equivalent of 90 meq/100 g was obtained.

Comparative Example 6

The process of Comparative Example 5 was followed except that 99.0 g of 12-hydroxystearic acid was replaced for 77.0 g of p-nonylphenl in the first step and the amounts of diethanolamine, N-methylethanolamine and aminoethylethanolamine ketimine were changed to 27.9 g, 19.8 g and 31.5 g, respectively. Cationic resin G having a number average molecular weight of 2700 and an amine equivalent of 90 meq/100 g was obtained.

Comparative Example 7

The same reactor as used in Example 17 was charged with 26.1 g of 2,4-/2,6-tolylenediisocyanate (80:20 weight ratio) and 13.0 g of MIBK. To the mixture was added dropwise 26.1 g of ethylene glycol mono-2-ethylhexyl ether over 1 hour while stirring and nitrogen gas bubbling. The inner temperature rose to 60° C. during this period. A solution of half blocked diisocyanate having an NCO equivalent of 350 was obtained. To this solution was added dropwise a solution of 95.0 g of bisphenol A epoxy resin having an epoxy equivalent of 475 and 750 g of bisphenol A epoxy resin having an epoxy equivalent of 950 in 150.0 g of MIBK. The mixture was allowed to react at 120° C. until the absorption of NCO disappeared in IR spectrometry. After cooling to 110° C., the mixture was further reacted with 35.4 g of diethanolamine, 25.2 g of N-methylethanolamine and 40.0 g of aminoethylethanolamine ketimine (79% solution in MIBK) for 2 hours, and diluted to 85.0% nonvolatile. Cationic resin H having a number average molecular weight of 2800 and an amine equivalent of 100 meq/100 g was obtained.

EXAMPLE 22

The same reactor as used in Example 17 was charged with 125.0 g of 4,4'-diphenylmethanediisocyanate, 75.0 g of MIBK and 0.05 g of dibutyltin dilaurate. To the mixture was added dropwise a mixture of 45.2 g of $\epsilon$-caprolactam, 47.2 g of ethylene glycol monobutyl ether, 4.0 g of methanol and 4.4 g of trimethylolpropane while stirring and nitrogen gas bubbling. The inner temperature rose to 60° C. during this period. The reaction was continued for additional 1 hour until the absorption of NCO disappeared in IR spectrometry. The product is hereinafter called Crosslinker K.

EXAMPLE 23

Analogous to Example 22, 199 g of hexamethylenediisocyanate trimer(CORONATE HX sold by Nippon Polyurethane K.K.) in 32 g of MIBK was blocked with 87.0 g of methylethylketoxime. The product is hereinafter called Crosslinker L.

EXAMPLE 24

148.0 g as solids of Crosslinker K, 252.0 g as solids of Cationic resin A and 5.0 g of dibutyltin oxide were throughly mixed. After heating to 80° C., the mixture was emulsified by slowly adding 266.6 g of deionized water containing 6.24 g of acetic acid thereto with stirring and then diluting with 445 g of deionized water to 36% solids. This emulsion was evaporated in vacuo to remove organic solvent, adjusted to 36% solids again with deionized water, mixed with 270 g of the pigment paste of Example 10, and finally diluted with 1400 g of deionized water and 30 g of ethylene glycol monohexyl ether to 20% nonvolatile to prepare a cathodic electrodeposition paint.

The paint was applied electrically on a zinc phosphate-treated steel plate used as cathode to a dry film thickness of 20 microns, baked under conditions shown in Table 2, and tested for its performance. The test results as well as the particle size of emulsion before mixing with the pigment paste measured by a spectrometer are shown in Table 2.

Examples 25–28 and Comparative Examples 8–10

Various paints having formulations shown in Table 2 were produced as in Example 24. The ratio of cationic resin/crosslinker in the paint was 63/37 throughout Examples and Comparative Examples. The result are shown in Table 2.

TABLE 2

| | Example | | | | | Comparative Example | | |
|---|---|---|---|---|---|---|---|---|
| | 24 | 25 | 26 | 27 | 28 | 8 | 9 | 10 |
| Component | | | | | | | | |
| Cationic resin | A | B | C | D | E | F | G | H |
| Crosslinker | K | K | L | L | L | K | K | K |
| Performance: | | | | | | | | |
| Emulsion particle 1) size, nm | 80 | 100 | 130 | 120 | 85 | 250 | 130 | 100 |
| Curability 2) | | | | | | | | |
| 150 × 20 min. | Good | Good | Good | Good | Good | Poor gloss | Poor gloss | Good |
| 160 × 20 min. | Good | Good | Good | Good | Good | Good | Good | Good |
| Appearance 3) Ra, μm, 160 × 20 min. | 0.22 | 0.25 | 0.20 | 0.22 | 0.21 | 0.23 | 0.24 | 0.25 |
| Salt Spray 4) 160 × 20 min. | No Change | No Change | No Change | No Change | No Change | Detectable blister | Detectable blister | No Change |
| Yellowing 5) 160 × 20 min. | No | No | No | No | No | No | No | Remarkable |

Footnote of Table 2
1) Determined by Hitachi Spectrometer Model U-1100.
2) Same as before.
3) Determined Surface Roughness Meter Model E-30A sold by Tokyo Seimitsu K. K.
4) According to JIS-Z 2371.
5) Same as before.

EXAMPLE 29

A flask equipped with a stirrer, condenser, nitrogen gas tube, thermometer and drip funnel was charged with 66.1 g of 2,4-/2,6-tolylenediisocyanate (80:20 weight ratio), 53.3 g of methyl isobutyl ketone (MIBK) and 0.12 g of dibutyltin dilaurate. To the mixture was added dropwise 13.6 g of methanol over 30 minutes while stirring and nitrogen gas bubbling. The inner temperature rose to 60° C. during this period. After continuing the reaction for additional 30 minutes, 46.8 g of 2-ethylhexanol was added dropwise over 1 hour and allowed to react at 60°–65° C. until the absorption of isocyanato group disappeared in IR spectrometry. Thereafter 310 g of bisphenol A epoxy resin having an epoxy equivalent of 188 and 0.8 g of benzyldimethylamine were added to the flask. Then the mixture was allowed to react at 120°–125° C. while distilling off methanol produced as a by-product until an epoxy equivalent of 338 was reached. The IR spectrometry demonstrated the absorption of oxazolidone carbonyl at $1750 cm^{-1}$. Then 57.0 g of bisphenol A was added to the mixture and allowed to react at 120° C. until an epoxy equivalent of 640 was reached. After cooling, the product was reacted at 65° C. with a solution of 92.3 g of dithioethanol and 100.5 g of dimethylolpropionic acid in 108.0 g of deionized water until an acid number of less than 5 was reached, and then diluted to 60% nonvolatile with a 1:1 mixture of ethyleneglycol monobutyl ether and dipropylene glycol monobutyl ether. Pigment dispersing resin A having a base equivalent of 78 meq/100 g was obtained.

EXAMPLE 30

A flask equipped with a stirrer, condenser, nitrogen gas tube, thermometer and drip funnel was charged with 62.6 g of 2,4-/2,6-tolylenediisocyanate(80:20 weight ratio), 55.1 g of methyl isobutyl ketone (MIBK) and 0.12 g of dibutyltin dilaurate. To the mixture was added dropwise 13.6 g of methanol over 30 minutes while stirring and nitrogen gas bubbling. The inner temperature rose to 60° C. during this period. After continuing the reaction for additional 30 minutes, 62.6 g of ethylene glycol mono-2-ethylhexyl ether was added dropwise over 1 hour and allowed to react at 60°–65° C. until the absorption of isocyanato group disappeared in IR spectrometry. Thereafter 310 g of bisphenol A epoxy resin having an epoxy equivalent of 188 and 0.8 g of benzyldimethylamine were added to the flask. Then the mixture was allowed to react at 120° C. while distilling off methanol produced as a by-product until an epoxy equivalent of 350 was reached. Then 57.0 g of bisphenol A was added to the mixture and allowed to react at 120° C. until an epoxy equivalent of 660 was reached. After cooling, the product was reacted at 65° C. with a solution of 102.2 g of 1-(2-hydroxyethylthio)-2-propanol and 100.5 g of dimethylolpropionic acid in 108.0 g of deionized water until an acid number of less than 5 was reached, and then diluted to 60% nonvolatile with a 1:1 mixture of ethylene glycol monobutyl ether and dipropylene glycol monobutyl ether. Pigment dispersing resin B was obtained.

EXAMPLE 31

Example 29 was followed using the following materials.

| Name | Parts |
| --- | --- |
| TDI | 66.1 |
| Methanol | 13.6 |
| Diethyleneglycol mono-2-ethylhexyl ether | 78.5 |
| Dibutyltin dilaurate | 0.12 |
| MIBK | 56.9 |
| Bisphenol A epoxy resin (E.E. = 188) | 310.2 |
| Bisphenol A | 57.0 |
| Dimethylbenzylamine | 0.8 |
| 1-(2-Hydroxyethylthio)-2,3-propanediol | 114.0 |
| Dimethylolpropionic acid | 100.5 |
| Deionized water | 108.0 |
| Total | 726.3 |

The product was diluted to 60% nonvolatile with a 1:1 mixture of ethyleneglycol monobutyl ether and dipropyleneglycol monobutyl ether to obtain Pigment dispersing resin C. Base equivalent =72.3 meq/100 g.

EXAMPLE 32

Example 29 was followed using the following materials.

| Name | Parts |
| --- | --- |
| TDI | 66.1 |
| Methanol | 13.6 |
| Ethyleneglycol mono-2-ethylhexyl ether | 62.6 |
| Dibutyltin dilaurate | 0.12 |
| MIBK | 55.1 |
| Bisphenol A epoxy resin (E.E. = 188) | 310.2 |
| Bisphenol A | 57.0 |
| Dimethylbenzylamine | 0.8 |
| 1-(2-Hydroxyethylthio)-2,3-propanediol | 124.5 |
| Dimethylolpropionic acid | 100.5 |
| Deionized water | 108.0 |
| Total | 720.0 |

The product was diluted to 60% nonvolatile with a 1:1 mixture of ethyleneglycol monobutyl ether and dipropyleneglycol monobutyl ether to obtain Pigment dispersing resin D. Base equivalent =72.9 meq/100 g.

EXAMPLE 33

Example 29 was followed using the following materials.

| Name | Parts |
| --- | --- |
| MDI | 95.0 |
| Methanol | 13.6 |
| Ethyleneglycol mono-2-ethylhexyl ether | 62.6 |
| Dibutyltin dilaurate | 0.12 |
| MIBK | 58.3 |
| Bisphenol A epoxy resin (E.E. = 188) | 310.2 |
| Bisphenol A | 57.0 |
| Dithioethanol | 92.3 |
| Dimethylolpropionic acid | 100.5 |
| Deionized water | 108.0 |
| Total | 717.6 |

The product was diluted to 60% nonvolatile with a 1:1 mixture of ethyleneglycol monobutyl ether and dipropyleneglycol monobutyl ether to obtain Pigment dispersing resin E. Base equivalent =72.0 meq/100 g.

EXAMPLE 34

Example 29 was followed using the following materials.

| Name | Parts |
| --- | --- |
| TDI | 66.1 |
| Methanol | 13.6 |
| Ethyleneglycol mono-2-ethylhexyl ether | 62.6 |
| Dibutyltin dilaurate | 0.12 |
| MIBK | 67.0 |
| Bisphenol A epoxy resin (E.E. = 475) | 475.0 |
| Dimethylbenzylamine | 0.8 |
| 1-(2-Hydroxyethylthio)-2-propanol | 81.7 |
| Dimethylolpropionic acid | 80.4 |
| Deionized water | 113.0 |
| Total | 765.8 |

The product was diluted to 60% nonvolatile with a 1:1 mixture of ethyleneglycol monobutyl ether and dipropyleneglycol monobutyl ether to obtain Pigment dispersing resin F. Base equivalent =55.0 meq/100 g.

EXAMPLE 35

Example 29 was followed using the following materials.

| Name | Parts |
|---|---|
| TDI | 26.1 |
| Methanol | 5.44 |
| Ethyleneglycol mono-2-ethylhexyl ether | 24.4 |
| Dibutyltin dilaurate | 0.12 |
| Bisphenol A epoxy resin (E.E. = 188) | 310.2 |
| Bisphenol A | 57.0 |
| Dimethylbenzylamine | 0.8 |
| 1-(2-Hydroxyethylthio)-2-propanol | 121.8 |
| Dimethylolpropionic acid | 132.7 |
| Deionized water | 129.6 |
| Total | 672.0 |

The product was diluted to 60% nonvolatile with a 1:1 mixture of ethyleneglycol monobutyl ether and dipropyleneglycol monobutyl ether to obtain Pigment dispersing resin G. Base equivalent =146.0 meq/100 g.

EXAMPLE 36

A flask equipped with a stirrer, condenser, nitrogen gas tube, thermometer and drip funnel was charged with 62.6 g of 2,4-/2,6-tolylenediisocyanate (80:20 weight ratio), 55.1 g of methyl isobutyl ketone (MIBK) and 0.12 g of dibutyltin dilaurate. To the mixture was added dropwise 13.6 g of methanol over 30 minutes while stirring and nitrogen gas bubbling. The inner temperature rose to 60° C. during this period. After continuing the reaction for additional 30 minutes, 62.6 g of ethylene glycol mono-2-ethylhexyl ether was added dropwise over 1 hour and allowed to react at 60°–65° C. until the absorption of isocyanato group disappeared in IR spectrometry. Thereafter 475.0 g of bisphenol A epoxy resin having an epoxy equivalent of 475, and 0.8 g of benzyldimethylamine were added to the flask. Then the mixture was allowed to react at 125° C. while distilling off methanol produced as a by-product until an epoxy equivalent of 1010 was reached. After cooling, 62.3 g of dimethylethanolamine, 63.0 g of lactic acid and 108.0 g of deionized were added to the mixture and allowed to react at 80° C. until an acid number of less than 1 was reached. The product was diluted to 60% nonvolatile with a 1:1 mixture of ethyleneglycol monobutyl ether and dipropyleneglycol monobutyl ether to obtain Pigment dispersing resin H.

EXAMPLE 37

A flask equipped with a stirrer, condenser, nitrogen gas tube, thermometer and drip funnel was charged with 62.6 g of 2,4-/2,6-tolylenediisocyanate(80:20 weight ratio), 55.1 g of methyl isobutyl ketone (MIBK) and 0.12 g of dibutyltin dilaurate. To the mixture was added dropwise 13.6 g of methanol over 30 minutes while stirring and nitrogen gas bubbling. The inner temperature rose to 60° C. during this period. After continuing the reaction for additional 30 minutes, 62.6 g of ethylene glycol mono-2-ethylhexyl ether was added dropwise over 1 hour and allowed to react at 60°–65° C. until the absorption of isocyanato group disappeared in IR spectrometry. Thereafter 475.0 g of bisphenol A epoxy resin having an epoxy equivalent of 475, and 0.8 g of benzyldimethylamine were added to the flask. Then the mixture was allowed to react at 120° C. while distilling off methanol produced as a by-product until an epoxy equivalent of 1010 was reached. After cooling, 51.8 g of N-methylethanolamine was added to the mixture and allowed to react until no epoxy group was detected in IR spectrometry. The product was further reacted with a solution of 101.0 g of glycidol and 90 g of lactic acid in 108.0 g of deionized water at 80° C. until an acid number of less than 1 was reached, and finally diluted to 60% nonvolatile with a 1:1 mixture of ethyleneglycol monobutyl ether and dipropyleneglycol monobutyl ether to obtain Pigment dispersing resin I.

EXAMPLE 38

Example 36 was followed using the following materials.

| Name | Parts |
|---|---|
| TDI | 26.1 |
| Methanol | 5.44 |
| Ethyleneglycol mono-2-ethylhexyl ether | 24.4 |
| Dibutyltin dilaurate | 0.12 |
| MIBK | 190.5 |
| Bisphenol A epoxy resin (E.E. = 950) | 950.0 |
| Dimethylbenzylamine | 0.8 |
| Dimethylethanolamine | 62.3 |
| Lactic acid (60%) | 63.0 |
| Total | 1204.0 |

The product was diluted to 60% nonvolatile with a 1:1 mixture of ethyleneglycol monobutyl ether and dipropyleneglycol monobutyl ether to obtain Pigment dispersing resin J. Base equivalent =48.0 meq/100 g.

Comparative Example 11

| Material | Parts | Solids |
|---|---|---|
| EPON 828 | 533.2 | 533.2 |
| Bisphenol A | 199.6 | 199.6 |
| Nonylphenol | 19.2 | 19.2 |
| Ethyltriphenylsulfonium iodide | 0.75 | — |
| Propyleneglycol monobutyl ether | 201.6 | — |
| Thiodiethanol | 122.1 | 122.1 |
| Dimetylolpropionic acid | 134.1 | 134.1 |
| Deionized water | 30.6 | — |

EPON 828, bisphenol A and nonylphenol were heated to 107° C. in a reactor and maintained to the temperature until bisphenol A was dissolved. After adding ethyltriphenylsulfonium iodide, the mixture was heated to 125° C. and cooled to 75° C. whereupon a mixture of propyleneglycol monobutyl ether, dithioethanol, dimethylolpropionic acid and deionized water was added thereto. The mixture was allowed to react at 70°–75° C. until an acid number of less than 3 was reached, cooled, and diluted to 30% solid with deionized water to obtain Pigment dispersing resin varnish K.

Comparative Example 12

Step 1

| Material | Parts | Solids |
|---|---|---|
| 2-Ethylhexanol-half blocked TDI in MIBK | 320.0 | 304.0 |
| Dimethylethanolamine | 87.2 | 87.2 |
| 75% Lactic acid | 117.6 | 88.2 |
| Ethyleneglycol monobutyl ether | 39.2 | — |

Dimethylethanolamine was added dropwise to 2-ethylhexanol-half blocked TDI in a reactor with stirring. An exothermic reaction took place. After stirring at 80° C. for 1 hour, the mixture was further reacted with lactic acid in ethyleneglycol monobutyl ether with stirring at 65° C. for 30 minutes to obtain a quaternizing agent.

Step 2

| Material | Parts | Solids |
|---|---|---|
| EPON 829 | 710.0 | 681.2 |
| Bisphenol A | 289.6 | 289.6 |
| 2-Ethylhexanol-half blocked TDI in MIBK | 406.4 | 386.1 |
| Quaternizing agent of Step 1 | 496.3 | 421.9 |
| Deionized water | 71.2 | — |
| Ethyleneglycol monobutyl ether | 56.76 | — |

EPON 829 was reacted with bisphenol A at 150°–160° C. for hour in a nitrogen gas atmosphere. After cooling to 120° C., the product was reacted with 2-ethylhexanol-half blocked TDI and homogenized at 85°–95° C. Then the quaternizing agent of Step 1 was added to the reaction mixture and allowed to react at 80–85° C. until an acid number of less than 1 was reached. The product is hereinafter called Pigment dispersing resin varnish L.

Examples 39–48 and Comparative Examples 13–14

Pigment paste:

Pigment paste were prepared by milling the following mixture to a particle size of less than 10 microns in a sand grind mill and evaluated their properties. The results are shown in Table 3.

| Material | Parts |
|---|---|
| Pigment dispersing resin | 125.0 (60.0% solids) |
| Deionized water | 400.0 |
| Carbon black | 8.5 |
| Kaolin | 72.0 |
| Titanium dioxide | 345.0 |
| Aluminum phosphomolybdrate | 75.0 |

A flask equipped with a stirrer, condenser, nitrogen gas tube, thermometer and drip funnel was charged with 285.0 g of oxazolidone ring-containing epoxy resin having an epoxy equivalent of 475 and an oxazolidone ring equivalent of 650 produced from bisphenol A epoxy resin and TDI, 380.0 g of bisphenolepoxy resin having an epoxy equivalent of 950, 77.0 g of p-nonylphenol and 82.4 g MIBK. After the addition of 3.0 g of benzyldimethylamine, the mixture was allowed to react at 130° C. until an epoxy equivalent of 1140 was reached. After cooling, the mixture was reacted with a mixture of 19.2 g of diethanolamine, 27.0 g of N-methylethanolamine and 30.6 g of aminoethylethanolamine ketimine (79% solution in MIBK) at 110° C. for two hours. The product was diluted to.90% nonvolatile with MIBK.

Crosslinker:

Crosslinker L of Example 23 was used.

Main emulsion:

The above binder resin and crosslinker were mixed at a solids ratio of 68:36 and ethyleneglycol monohexyl ether was added to the mixture in an amount corresponding to 2% of solids. After adding acetic acid to achieve 42.5% neutralization, the mixture was slowly diluted with deionized water and evaporated in vacuo to 36.0% solids by removing MIBK.

Paint evaluation:

Various cathodic paints were prepared by mixing 2000.0 g of the above main emulsion, 460.0 g of the above pigment paste and 2252.0 g of deionized water.

The paint was applied electrically on a zinc phosphate-treated cold rolled steel plate to a dry film thickness of 20 microns, baked at 160° C. for 10 minutes, and tested for the paint film performance. The result are shown in Table 3.

TABLE 3

| | Examples | | | | | | | | | | Comparative Example | |
|---|---|---|---|---|---|---|---|---|---|---|---|---|
| | 39 | 40 | 41 | 42 | 43 | 44 | 45 | 46 | 47 | 48 | 13 | 14 |
| Pigment resin | A | B | C | D | E | F | G | H | I | J | K | L |
| Thermal stability 1) | G | G | G | G | G | G | G | G | G | G | G | NG |
| Dispersion stability 2) | G | G | G | G | G | G | G | G | G | G | NG | G |
| Coulomb efficiency 3) | G | G | G | G | G | G | G | G | G | G | NG | G |
| Salt spray 4) | G | G | G | G | G | G | G | G | G | G | G | NG |
| Yellowing 5) | | | | | | | | | | | | |
| at 160° C. | G | G | G | G | G | G | G | G | G | G | G | NG |
| at 180° C. | G | G | G | G | G | G-F | G | G | G | G-F | G | NG |

Footnote of Table 3
1) Thermal stability at 220° C. for 20 minutes.
Good: No enamation of diisocyanate.
Not Good: Enamation of diisocyanate.
2) Storate stability of the pigment paste after standing for two weeks at 40° C.
Good: No sedimentation.
Not Good: Sedimentation of cake or phase separation.
3) Deposition efficiency in terms of mg/Coulomb under the conditions for obtaining 20 micron film thickness.
Good: >35 mg/Coulomb.
Not Good: <35 mg/Coulomb.

TABLE 3-continued

|  | Examples | | | | | | | | | | Comparative Example | |
|---|---|---|---|---|---|---|---|---|---|---|---|---|
|  | 39 | 40 | 41 | 42 | 43 | 44 | 45 | 46 | 47 | 48 | 13 | 14 |

4) According to JIS-Z 2371.
Good: No change
Not Good: Blister on whole area.
5) A white paint for middle layer was sprayed on a specimen of film baked at 160° C. × 10 min. or 180° C. × 20 min. and then baked at 140° C. × 20 min. The degree of yellowing of the white paint film was determined visually in comparison with reference specimen plate directly finished with the white paint.
Good: No yellowing.
Fair: Slight yellowing.
Not good: Remarkable yellowing.

EXAMPLE 49

A flask equipped with a stirrer, condenser, nitrogen gas tube, thermometer and drip funnel was charged with 54.0 g of 2,4-/2,6-tolylenediisocyanate (80:20 weight ratio), 136 g of methyl isobutyl ketone (MIBK) and 0.05 g of dibutyltin dilaurate. To the mixture was added dropwise 10.9 g of methanol over 30 minutes while stirring and nitrogen gas bubbling. The inner temperature rose to 60° C. during this period. After continuing the reaction for additional 30 minutes, 36.2 g of dibutylamine was added dropwise over 1 hour and allowed to react at 60°–65° C. until the absorption of isocyanato group disappeared in IR spectrometry. Thereafter 285 g of bisphenol A epoxy resin having an epoxy equivalent of 475, 380 g of bisphenol A epoxy resin having an epoxy equivalent of 950 and 0.62 g of benzyldimethylamine were added to the flask. Then the mixture was allowed to react at 120° C. while distilling off methanol produced as a by-product until an epoxy equivalent of 1120 was reached. After cooling, 29.1 g of diethanolamine, 21.5 g of N-methylethanolamine and 32.9 g of aminoethylethanolamine ketimine (79% solution in MIBK) were added to the mixture and allowed to react at 110° C. for 2 hours. The IR spectrometry demonstrated the absorption of oxazolidone carbonyl at 1750 cm$^{-1}$. The product was diluted to 80% nonvolatile with MIBK. The cationic resin thus produced exhibited a satisfactory emulsifiability.

EXAMPLE 50

A flask equipped with a stirrer, condenser, nitrogen gas tube, thermometer and drip funnel was charged with 54.0 g of 2,4-/2,6-tolylenediisocyanate(80:20 weight ratio), 136 g of methyl isobutyl ketone (MIBK) and 0.05 g of dibutyltin dilaurate. To the mixture was added dropwise 10.9 g of methanol over 30 minutes while stirring and nitrogen gas bubbling. The inner temperature rose to 60° C. during this period. After continuing the reaction for additional 30 minutes, 40.4 g of octanoic acid was added dropwise over 1 hour and allowed to react at 60°–65° C. until the absorption of isocyanato group disappeared in IR spectrometry. Thereafter 285 g of bisphenol A epoxy resin having an epoxy equivalent of 475, 380 g of bisphenol A epoxy resin having an epoxy equivalent of 950 and 0.62 g of benzyldimethylamine were added to the flask. Then the mixture was allowed to react at 120° C. while distilling off methanol produced as a by-product until an epoxy equivalent of 1120 was reached. After cooling, 29.1 g of diethanolamine, 21.5 g of N-methylethanolamine and 32.9 g of aminoethylethanolamine ketimine (79% solution in MIBK) were added to the mixture and allowed to react at 110° C. for 2 hours. The IR spectrometry demonstrated the absorption of oxazolidone carbonyl at 1750 cm$^{-1}$. The product was diluted to 80% nonvolatile with MIBK. The cationic resin thus produced exhibited a satisfactory emulsifiability.

We claim:

1. A modified epoxy resin having bound thereto at least one blocked isocyanate moiety through an oxazolidone ring formed by the reaction between a portion of the epoxy groups of a polyglycidyl epoxy resin and one isocyanato group of an organic diisocyanate, the other isocyanate group thereof being reversibly or irreversibly blocked, the modified epoxy resin further having introduced thereto at least one cationic group by the ring-opening reaction of the remaining epoxy rings with a cationic group introducing active hydrogen compound.

2. The modified epoxy resin of claim 1, wherein said polyglycidyl epoxy resin is a polyphenol polyglycidyl ether epoxy resin, an aliphatic polyol polyglycidyl ether epoxy resin, a polycarboxylic acid polyglycidyl ester epoxy resin or a chain extended product thereof.

3. The modified epoxy resin of claim 1, wherein said other isocyanato group is reversibly blocked with an aliphatic monoalcohol having at least 4 carbon atoms, an alkylphenol, a glycol monoether, a ketoxime or a lactam.

4. The modified epoxy resin of claim 1, wherein said other isocyanato group is irreversibly blocked with a primary or secondary amine, a tertiary aminoalkanol, or an aliphatic monocarboxylic acid.

5. The modified epoxy resin of claim 1, wherein said cationic group introducing active hydrogen compound for opening the remaining epoxy rings is a primary amine, a secondary amine, an acid addition salt of tertiary amine or a sulfide-acid mixture.

* * * * *